United States Patent
Zhu et al.

(10) Patent No.: US 10,829,647 B2
(45) Date of Patent: Nov. 10, 2020

(54) CHROMIUM-FREE CORROSION INHIBITION COATING

(71) Applicant: Hamilton Sundstrand Corporation, Charlotte, NC (US)

(72) Inventors: Tianli Zhu, Glastonbury, CT (US); Blair A. Smith, South Windsor, CT (US); Weilong Zhang, Glastonbury, CT (US); Michael A. Kryzman, West Hartford, CT (US); Georgios S. Zafiris, Glastonbury, CT (US); Bart Antonie van Hassel, Weatogue, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/216,672

(22) Filed: Dec. 11, 2018

(65) Prior Publication Data

US 2020/0181424 A1    Jun. 11, 2020

(51) Int. Cl.
*C09D 5/08* (2006.01)
*C23F 11/12* (2006.01)
*C23F 11/18* (2006.01)

(52) U.S. Cl.
CPC ............ *C09D 5/084* (2013.01); *C09D 5/086* (2013.01); *C23F 11/126* (2013.01); *C23F 11/184* (2013.01); *C23F 11/185* (2013.01)

(58) Field of Classification Search
CPC ....... C09D 5/084; C09D 5/086; C23F 11/126; C23F 11/184; C23F 11/185
See application file for complete search history.

(56) References Cited

U.S. PATENT DOCUMENTS

| | | | |
|---|---|---|---|
| 4,950,453 A | 8/1990 | Murray | |
| 5,419,790 A | 5/1995 | Miller | |
| 7,341,677 B2 * | 3/2008 | Yu | C23F 11/08 252/389.1 |
| 7,972,533 B2 * | 7/2011 | Jaworowski | C09D 5/084 252/387 |
| 8,088,204 B2 | 1/2012 | Taylor et al. | |
| 9,809,715 B2 | 11/2017 | Zhang et al. | |
| 10,023,963 B2 * | 7/2018 | Ding | C23F 13/12 |
| 10,138,561 B2 * | 11/2018 | Ding | C09D 5/00 |
| 10,294,962 B2 * | 5/2019 | Strock | F01D 11/122 |
| 2009/0004486 A1 * | 1/2009 | Arsenault | C09D 5/084 428/457 |
| 2010/0197836 A1 | 8/2010 | Price et al. | |
| 2013/0273364 A1 * | 10/2013 | Breidenstein | C09D 163/00 428/371 |
| 2014/0212354 A1 * | 7/2014 | Arsenault-Preece | C09D 5/084 423/594.14 |
| 2017/0350019 A1 | 12/2017 | Ding et al. | |
| 2018/0073152 A1 * | 3/2018 | Arsenault | C09D 5/084 |
| 2018/0320272 A1 * | 11/2018 | Ding | C23F 13/005 |
| 2019/0085865 A1 * | 3/2019 | Strock | F01D 11/122 |
| 2019/0127860 A1 | 5/2019 | Ding et al. | |

FOREIGN PATENT DOCUMENTS

| | | | |
|---|---|---|---|
| CN | 101481510 A | * | 7/2009 |
| CN | 104804613 A | * | 7/2015 |
| CN | 107216697 A | | 9/2017 |
| CN | 108912878 A | * | 11/2018 |
| EP | 1975207 A1 | | 10/2008 |
| EP | 2924078 A1 | | 9/2015 |

OTHER PUBLICATIONS

Extended European Search Report issued in EP Application No. 19214574.6 dated May 25, 2020.

* cited by examiner

*Primary Examiner* — Anthony J Green
(74) *Attorney, Agent, or Firm* — Cantor Colburn LLP

(57) ABSTRACT

Disclosed is a corrosion inhibition coating, comprising: a base comprising a matrix and a metal within the matrix; and an inhibitor comprising: zinc molybdate, cerium citrate, magnesium metasilicate, a metal phosphate silicate, or a combination thereof, wherein the metal within the matrix comprises aluminum, an aluminum alloy, zinc, a zinc alloy, magnesium, a magnesium alloy, or a combination thereof. Also disclosed is a substrate coated with the corrosion inhibition coating.

20 Claims, 2 Drawing Sheets

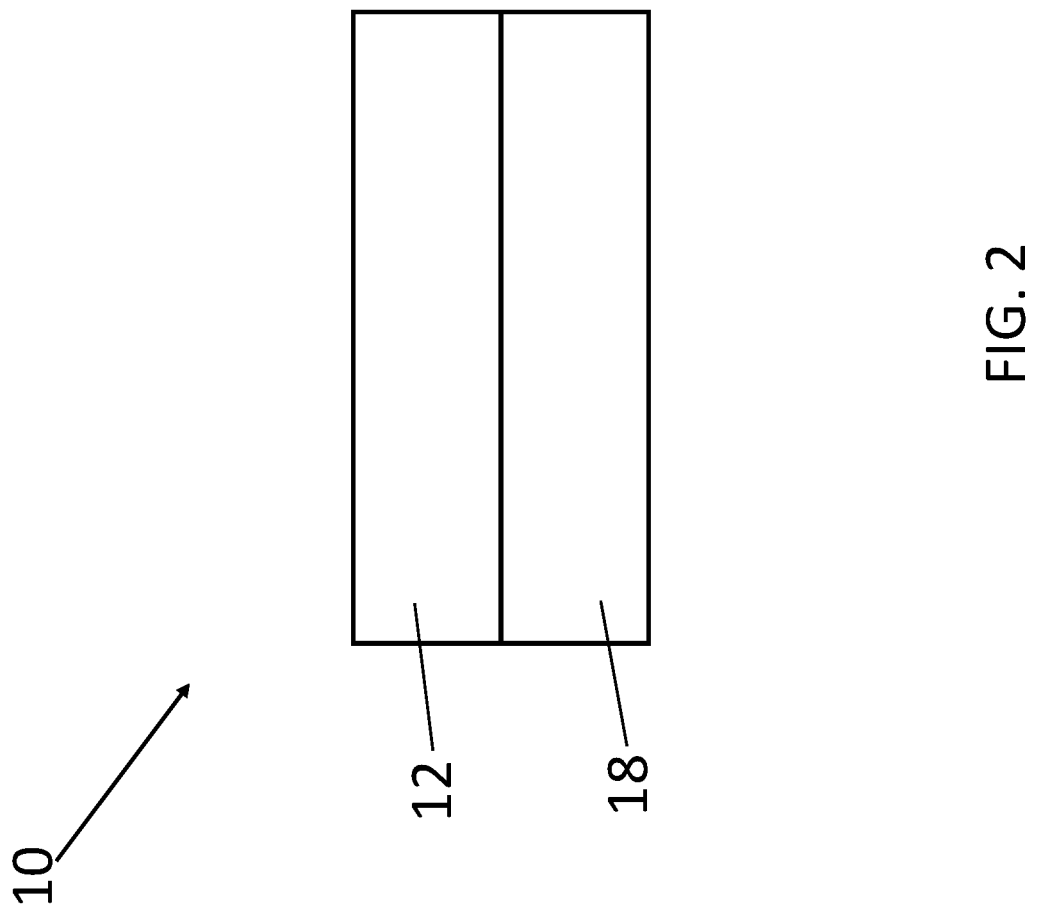

CHROMIUM-FREE CORROSION INHIBITION COATING

BACKGROUND

Exemplary embodiments pertain to the art of corrosion inhibition coatings, more particularly, to chromium-free corrosion inhibition coatings for aircraft components.

Alloys require corrosion protection in aerospace applications. Conventional sacrificial corrosion inhibition coatings for high operating temperatures are based on aluminum-ceramic paints with hexavalent chromium compound additives as corrosion inhibitors. However, hexavalent chromium-containing compounds are considered environmental hazards by government agencies around the world. In addition, chromium-free compounds can lack sufficient corrosion inhibition properties.

Therefore, there is a need to develop a chromium-free corrosion inhibition coating with equal or better corrosion inhibition properties as compared to conventional hexavalent chromium-containing compounds.

BRIEF DESCRIPTION

Disclosed is a corrosion inhibition coating, comprising: a base comprising a matrix and a metal within the matrix; and an inhibitor comprising: zinc molybdate, cerium citrate, magnesium metasilicate, a metal phosphate silicate, or a combination thereof, wherein the metal within the matrix comprises aluminum, an aluminum alloy, zinc, a zinc alloy, magnesium, a magnesium alloy, or a combination thereof.

Also disclosed is a substrate coated with the corrosion inhibition coating.

BRIEF DESCRIPTION OF THE DRAWINGS

The following descriptions should not be considered limiting in any way. With reference to the accompanying drawings, like elements are numbered alike:

FIG. 2 is a cross-section of a mixed corrosion inhibition coating on a substrate according to an exemplary embodiment.

DETAILED DESCRIPTION

Figure 1:
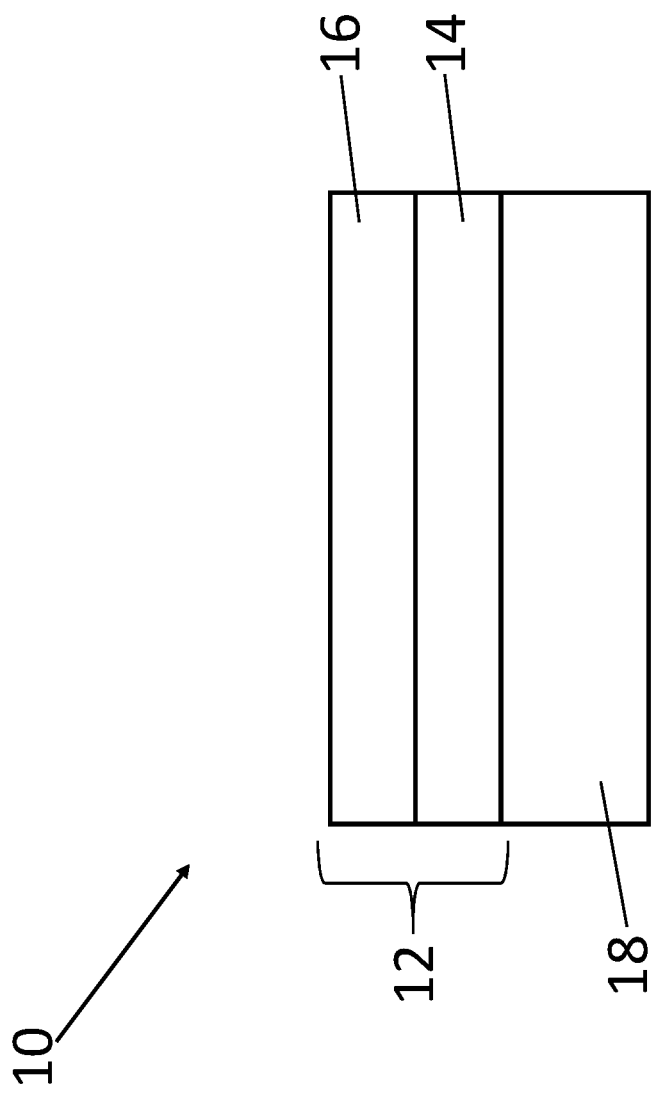
FIG. 1 is a cross-section of a corrosion inhibition coating comprising two distinct layers on a substrate according to an exemplary embodiment.

A detailed description of one or more embodiments of the disclosed apparatus and method are presented herein by way of exemplification and not limitation with reference to the Figures.

Referring to FIG. 1, a multilayer structure 10 includes a corrosion inhibition coating 12 coated on a substrate 18. The corrosion inhibition coating 12 can comprise an inhibitor 16 coated on a base 14. The base 14 and the inhibitor 16 can be two distinct layers as shown in FIG. 1. Referring to the multilayer structure 10 of FIG. 2, an inhibitor 16 can be mixed within a base 14 to form a corrosion inhibition coating 12 as a single layer. The corrosion inhibition coating 12 can be coated on the substrate 18.

The corrosion inhibition coating 12 can be a chromium-free corrosion inhibition coating, for example, a chromate-free corrosion inhibition coating, with equal or better corrosion inhibition properties as compared to conventional hexavalent chromium-containing compounds. The corrosion inhibition coating 12 can function in a wide range of applications, environments, and temperatures. The corrosion inhibition coating 12 is also environmentally friendly. The corrosion inhibition coating 12 can inhibit the corrosion of metal, thereby extending the life-time of a substrate 18.

As shown in FIG. 1, for example, the corrosion inhibition coating 12 can comprise a base 14 comprising a matrix and a metal within the matrix. In the coatings disclosed herein, the matrix can comprise any suitable silicate, epoxy, ceramic, or a combination thereof. For example, suitable ceramics can include alumina, beryllia, ceria, zirconia, carbide, boride, nitride, and silicide. The metal within the matrix can comprise aluminum, an aluminum alloy, zinc, a zinc alloy, magnesium, a magnesium alloy, or a combination thereof.

The corrosion inhibition coating 12 can also comprise an inhibitor 16. For example, the inhibitor 16 can comprise zinc molybdate ($ZnMoO_4$), cerium citrate, for example, trivalent cerium citrate ($C_6H_5CeO_7$), magnesium metasilicate ($MgO_3Si$), and a metal phosphate silicate. The inhibitor 16 can be in the form of a powder.

The corrosion inhibition coating 12 can comprise about 1% to about 99% base 14 by volume and about 1% to about 99% inhibitor 16 by volume. For example, the corrosion inhibition coating 12 can comprise about 70% to about 95% base 14 by volume and about 5% to about 30% inhibitor 16 by volume. The corrosion inhibition coating 12 can comprise about 85% to about 95% base 14 by volume and about 5% to about 15% inhibitor 16 by volume. The corrosion inhibition coating 12 can comprise less than or equal to about 50% inhibitor 16 by volume. For example, the corrosion inhibition coating 12 can comprise less than or equal to about 10% inhibitor 16 by volume.

The inhibitor 16 can comprise about 0% to about 100% zinc molybdate by weight; about 0% to about 100% cerium citrate, for example, trivalent cerium citrate by weight; about 0% to about 100% magnesium metasilicate by weight; and about 0% to about 100% of a metal phosphate silicate by weight. For example, the inhibitor 16 can comprise about 1% to about 50% zinc molybdate by weight; about 1% to about 50% cerium citrate, for example, trivalent cerium citrate, by weight; about 1% to about 50% magnesium metasilicate by weight; and about 1% to about 50% of a metal phosphate silicate by weight. For example, the inhibitor 16 can comprise about 25% zinc molybdate by weight; about 25% cerium citrate by weight; about 25% magnesium metasilicate by weight; and about 25% of a metal phosphate silicate by weight.

The inhibitor 16 can comprise about ⅓ zinc molybdate by weight; about ⅓ magnesium metasilicate by weight; and about ⅓ of a metal phosphate silicate by weight. The inhibitor 16 can comprise about 50% zinc molybdate by weight; and about 50% cerium citrate, for example, trivalent cerium citrate, by weight. The inhibitor 16 can also consist of only four components, namely, the zinc molybdate, the cerium citrate, the magnesium metasilicate, and the metal phosphate silicate. For example, the corrosion inhibition coating 12 can comprise 0% magnesium molybdate. The corrosion inhibition coating 12 can also comprise 0% chromium.

The metal phosphate silicate of the inhibitor 16 can comprise aluminum phosphate silicate, zinc phosphate silicate, calcium phosphate silicate, strontium phosphate silicate, or a combination thereof.

The inhibitor 16 can be mixed within the base 14, for example so as to form a single layer 12 as shown in FIG. 2. For example, the matrix of the base 14 can serve as the matrix for the inhibitor 16. The base 14 and the inhibitor 16 can also be unmixed, for example so as to form two distinct layers as shown in FIG. 1. In the case where the base 14 and the inhibitor 16 form two distinct layers, the inhibitor 16 can be coated on the base 14 and is thus further from the substrate 18 than the base 14.

In the case where the base 14 and the inhibitor 16 form two distinct layers, the inhibitor 16 can further comprise a second matrix. For example, the inhibitor 16 can comprise about 0% to about 50% zinc molybdate by volume; about 0% to about 50% cerium citrate, for example, trivalent cerium citrate by volume; about 0% to about 50% magnesium metasilicate by volume; and about 0% to about 50% of a metal phosphate silicate by volume, mixed within the second matrix. For example, the second matrix can be greater than or equal to about 50% by volume of the inhibitor 16. For example, the second matrix can comprise silicate, epoxy, ceramic, or a combination thereof.

The curing temperature of the corrosion inhibition coating 12 will vary depending on the particular matrix used. For example, curing temperatures can be different for silicate, epoxy, and ceramic matrices. Curing duration can also vary with curing temperature. For example, if a higher curing temperature is used, less curing time is required.

In the case where the inhibitor 16 is mixed within the base 14 so as to form a single layer, the corrosion inhibition coating 12 can be cured at a single temperature, corresponding to the matrix used. In the case where the base 14 and the inhibitor 16 form two distinct layers, two different curing temperatures can be used, corresponding to the matrix used for each layer. For example, the base 14 can be cured at a first temperature, followed by addition of the inhibitor 16 and curing at a second temperature. For example, curing temperatures can be about 20° C. to about 200° C.

The corrosion inhibition coating 12 can be coated onto a substrate 18. For example, the substrate 18 can comprise steel, aluminum, zinc, magnesium, or a combination thereof. For example, the substrate 18 can comprise alloys of these metals. The corrosion inhibition coating 12 can function in a wide range of applications and environmental temperatures. For example, the substrate 18 can be an aircraft component. For example, the aircraft component can be a propeller blade, a propeller shank, a propeller hub, a propeller barrel, a propeller tulip, a landing gear component, an engine gear, an engine disc, a shaft, for example, an engine shaft, a strut, or a counterweight.

Set forth below are some embodiments of the foregoing disclosure:

Embodiment 1

A corrosion inhibition coating, comprising: a base comprising a matrix and a metal within the matrix; and an inhibitor. The inhibitor comprising: zinc molybdate, cerium citrate, magnesium metasilicate, a metal phosphate silicate, or a combination thereof. The he metal within the matrix comprises aluminum, an aluminum alloy, zinc, a zinc alloy, magnesium, a magnesium alloy, or a combination thereof.

Embodiment 2

The corrosion inhibition coating of Embodiment 1, wherein the matrix comprises silicate, epoxy, ceramic, or a combination thereof.

Embodiment 3

The corrosion inhibition coating of Embodiment 1 or 2, wherein the corrosion inhibition coating comprises: about 70% to about 95% base by volume; and about 5% to about 30% inhibitor by volume.

Embodiment 4

The corrosion inhibition coating of any one of the preceding Embodiments, wherein the corrosion inhibition coating comprises less than or equal to about 10% inhibitor by volume.

Embodiment 5

The corrosion inhibition coating of any one of the preceding Embodiments, wherein the inhibitor consists of: zinc molybdate; cerium citrate; magnesium metasilicate; and a metal phosphate silicate.

Embodiment 6

The corrosion inhibition coating of any one of the preceding Embodiments, wherein the inhibitor comprises: about 25% zinc molybdate by weight; about 25% cerium citrate by weight; about 25% magnesium metasilicate by weight; and about 25% of a metal phosphate silicate by weight.

Embodiment 7

The corrosion inhibition coating of any one of the preceding Embodiments, wherein the inhibitor comprises: about 1% to about 50% zinc molybdate by weight; about 1% to about 50% cerium citrate by weight; about 1% to about 50% magnesium metasilicate by weight; and about 1% to about 50% of a metal phosphate silicate by weight.

Embodiment 8

The corrosion inhibition coating of any one of the preceding Embodiments, wherein the corrosion inhibition coating comprises 0% chromium.

Embodiment 9

The corrosion inhibition coating of any one of the preceding Embodiments, wherein the corrosion inhibition coating comprises 0% magnesium molybdate.

Embodiment 10

The corrosion inhibition coating of any one of the preceding Embodiments, wherein the metal phosphate silicate comprises aluminum phosphate silicate, zinc phosphate silicate, calcium phosphate silicate, strontium phosphate silicate, or a combination thereof.

Embodiment 11

The corrosion inhibition coating of any one of the preceding Embodiments, wherein the inhibitor is a powder.

Embodiment 12

The corrosion inhibition coating of any one of Embodiments 1 to 11, wherein the inhibitor is mixed within the base.

Embodiment 13

The corrosion inhibition coating of any one of Embodiments 1 to 11, wherein the base and the inhibitor are two distinct layers.

Embodiment 14

The corrosion inhibition coating of Embodiment 13, wherein the inhibitor is coated on the base.

Embodiment 15

The corrosion inhibition coating of Embodiment 13 or Embodiment 14, further comprising a second matrix, wherein the inhibitor is mixed within the second matrix.

Embodiment 16

The corrosion inhibition coating of Embodiment 15, wherein the second matrix comprises silicate, epoxy, ceramic, or a combination thereof.

Embodiment 17

A substrate coated with the corrosion inhibition coating of any one of the preceding Embodiments.

Embodiment 18

The substrate of Embodiment 17, wherein the substrate comprises steel, aluminum, zinc, magnesium, or a combination thereof.

Embodiment 19

The substrate of Embodiment 17 or Embodiment 18, wherein the substrate is an aircraft component.

Embodiment 20

The substrate of Embodiment 19, wherein the aircraft component is a propeller blade, a propeller shank, a propeller hub, a propeller barrel, a propeller tulip, a landing gear component, an engine gear, an engine disc, a shaft, a strut, or a counterweight.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components (and encompasses "consist(s) of", "consisting of", "consist(s) essentially of" and "consisting essentially of"), but do not necessarily preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A corrosion inhibition coating composition, comprising:
   a base comprising a matrix and a metal within the matrix; and
   an inhibitor comprising two or more of:
   zinc molybdate,
   cerium citrate,
   magnesium metasilicate,
   a metal phosphate silicate,
   wherein the metal within the matrix comprises aluminum, an aluminum alloy, zinc, a zinc alloy, magnesium, a magnesium alloy, or any combination(s) thereof.

2. The corrosion inhibition coating composition of claim 1, wherein the matrix comprises silicate, epoxy, ceramic, or any combination(s) thereof.

3. The corrosion inhibition coating composition of claim 1, wherein the corrosion inhibition coating composition comprises:
   about 70% to about 95% base by volume; and
   about 5% to about 30% inhibitor by volume.

4. The corrosion inhibition coating composition of claim 1, wherein the corrosion inhibition coating composition comprises less than or equal to about 10% inhibitor by volume.

5. The corrosion inhibition coating composition of claim 1, wherein the inhibitor comprises three or more of:
   zinc molybdate;
   cerium citrate;
   magnesium metasilicate;
   a metal phosphate silicate.

6. The corrosion inhibition coating composition of claim 1, wherein the corrosion inhibition coating composition comprises 0% chromium.

7. The corrosion inhibition coating composition of claim 1, wherein the corrosion inhibition coating composition comprises 0% magnesium molybdate.

8. The corrosion inhibition coating composition of claim 1, wherein the metal phosphate silicate comprises aluminum phosphate silicate, zinc phosphate silicate, calcium phosphate silicate, strontium phosphate silicate, or any combination(s) thereof.

9. The corrosion inhibition coating composition of claim 1, wherein the inhibitor is a powder.

10. The corrosion inhibition coating composition of claim 1, wherein the inhibitor is mixed within the base.

11. The corrosion inhibition coating composition of claim 1, wherein the base and the inhibitor are two distinct layers.

12. The corrosion inhibition coating composition of claim 11, wherein the inhibitor is coated on the base.

13. The corrosion inhibition coating composition of claim 11, further comprising a second matrix, wherein the inhibitor is mixed within the second matrix.

14. The corrosion inhibition coating composition of claim 13, wherein the second matrix comprises silicate, epoxy, ceramic, or any combination(s) thereof.

15. A substrate coated with the corrosion inhibition coating composition of claim 1.

16. The substrate of claim 15, wherein the substrate comprises steel, aluminum, zinc, magnesium, or any combination(s) thereof.

17. The substrate of claim 15, wherein the substrate is an aircraft component.

18. The substrate of claim 17, wherein the aircraft component is a propeller blade, a propeller shank, a propeller hub, a propeller barrel, a propeller tulip, a landing gear component, an engine gear, an engine disc, a shaft, a strut, or a counterweight.

19. A corrosion inhibition coating composition comprising:
 a base comprising a matrix and a metal within the matrix; and
 an inhibitor comprising:
 zinc molybdate;
 cerium citrate;
 magnesium metasilicate; and
 a metal phosphate silicate,
 wherein the metal within the matrix comprises aluminum, an aluminum alloy, zinc, a zinc alloy, magnesium, a magnesium alloy, or any combination(s) thereof.

20. A corrosion inhibition coating composition comprising:
 a base comprising a matrix and a metal within the matrix; and
 an inhibitor comprising:
 zinc molybdate; and
 cerium citrate,
 wherein the metal within the matrix comprises aluminum, an aluminum alloy, zinc, a zinc alloy, magnesium, a magnesium alloy, or any combination(s) thereof.

* * * * *